Patented June 9, 1925.

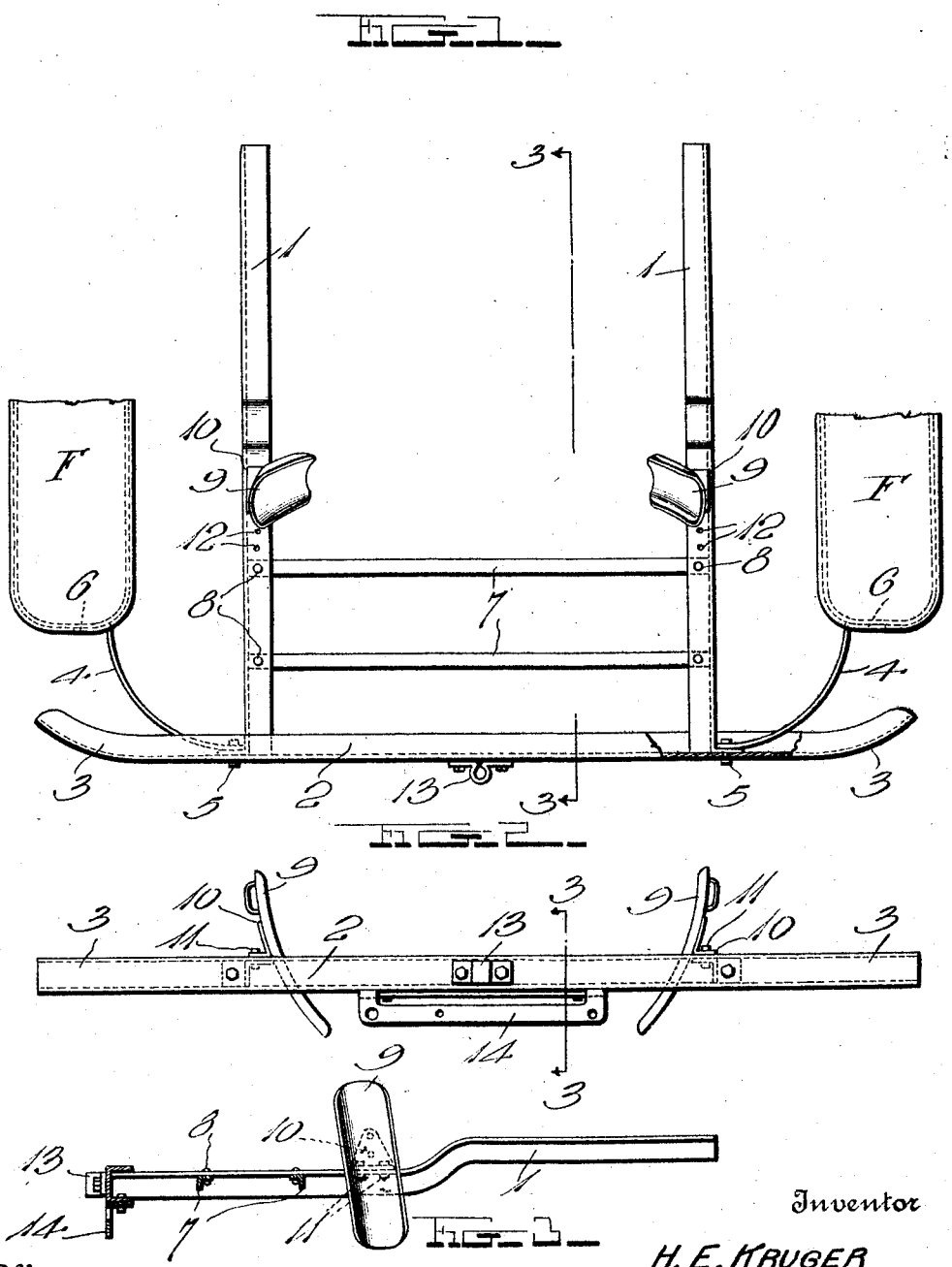

1,540,846

UNITED STATES PATENT OFFICE.

HERMAN E. KRUGER, OF MINNEAPOLIS, MINNESOTA, ASSIGNOR OF TWO-FIFTHS TO E. H. LATIMER, OF MINNEAPOLIS, MINNESOTA.

COMBINATION ATTACHMENT FOR AUTOMOBILES.

Application filed February 12, 1923. Serial No. 618,703.

*To all whom it may concern:*

Be it known that I, HERMAN E. KRUGER, a citizen of the United States, residing at Minneapolis, in the county of Hennepin and State of Minnesota, have invented certain new and useful Improvements in Combination Attachments for Automobiles; and I do declare the following to be a full, clear, and exact description of the invention, such as will enable others skilled in the art to which it appertains to make and use the same.

My invention relates to improvements in automobile accessories and has for its principal object to provide a simple and inexpensive, easily attached and durable article embodying a rear bumper, a luggage carrier, a tire carrier and a fender brace, a trailer hitch and a license plate and tail light bracket being also preferably included.

With the foregoing in view, the invention resides in the novel subject matter hereinafter described and claimed, the description being supplemented by the accompanying drawing.

Figure 1 is a top plan view of the attachment and portions of the rear fenders of an automobile.

Fig. 2 is a rear elevation of the attachment.

Fig. 3 is a vertical longitudinal sectional view as indicated by the lines 3—3 of Figs. 1 and 2.

In the drawings above briefly described, the numerals 1 designate a pair of longitudinally disposed bars which are preferably formed of angle metal, the front ends of these bars being adapted for securing in any desired manner to the chassis frame of an automobile, while the rear ends of said bars are intended to extend rearwardly from the machine. These rear ends carry a transverse bumper 2 which is preferably formed of channel metal with its ends 3 projecting laterally beyond the bars 1 for disposition in rear of the rear fenders F of the machine. Diagonal braces 4 which are preferably curved as shown in Fig. 1 are secured at their rear ends to the bumper 2, the same bolts 5 being used for securing these braces and for securing the bumper to the bars 1. The front ends of the braces 4 are bent laterally outward as indicated at 6 to be bolted to the usual fender flanges.

A pair of parallel transverse bars 7 have their ends secured at 8 to the side bars 1, said bars 7 being spaced apart in front of the bumper 2 to co-operate with the latter in forming an effective luggage carrier. Furthermore, the oblique braces 4 in the angles between the projecting bumper ends 3 and the bars 1, also co-operate with the bumper and bars 1 and 7, in forming the luggage support, it being obvious that if certain objects secured upon the major portion of the luggage carrier, should extend beyond the bars 1, these articles will be upheld by the braces 4 and the bumper ends 3.

A pair of suitably shaped tire carrying shoes 9 are provided with attaching brackets 10 secured by bolts 11 to the bars 1, in front of the transverse bars 7, said bars 1 being preferably formed with spaced openings 12 so that the shoes 9 may be adjusted longitudinally of said bars, as occasion may demand, in applying the attachment to an automobile.

The center of the bumper 2 is preferably provided with a trailer hitch 13 and a license plate and tail light bracket 14 may well be secured also to this bumper.

By employing the construction shown, an attachment is provided which performs a manifold function, that is it acts as a bumper, as a luggage carrier, as a tire carrier, as a fender brace, as a trailer hitch, and as a tail light and license plate support. It will thus be seen that the attachment is very advantageous, particularly when it is applied to a machine to be used for long distance touring, in connection with which a trailer is often carried.

As excellent results are obtainable from the details disclosed, these details are preferably followed, but within the scope of the invention as claimed, numerous minor changes may be made. Furthermore, attention may be directed to the fact that while mild steel is preferably used in the construction of the device, any other desired material may be used if desired.

I claim:—

1. An attachment for automobiles comprising a bumper bar for disposition at the rear end of the automobile, a pair of longitudinal carrying bars for said bumper, a plurality of transverse bars in front of said bumper and secured at their ends to said longitudinal bars, all of said bars cooperating in forming a luggage carrier, the ends of said bumper bar extending beyond said longitudinal bars, and oblique fender braces in the angles between said longitudinal bars and said extended ends of the bumper bar, said fender braces and said extended ends of the bumper bar cooperating in forming extensions for the luggage carrier.

2. An attachment for automobiles comprising a bumper bar for disposition at the rear end of the automobile, a pair of longitudinal carrying bars for said bumper bar, a plurality of transverse bars in front of said bumper bar and secured at their rear ends to said longitudinal bars, the ends of said bumper bar being extended beyond said longitudinal bars, oblique fender braces in the angles between said extended bumper bar ends and said longitudinal bars, tire carrying shoes carried by said longitudinal bars in front of said transverse bars, a trailer hitch carried by the center of said bumper bar, and means carried by said bumper bar for supporting a tail light and a license plate.

In testimony whereof I have hereunto affixed my signature.

HERMAN E. KRUGER.